May 14, 1963 W. F. STERNE 3,089,146
SWEAT BAND
Filed April 2, 1959
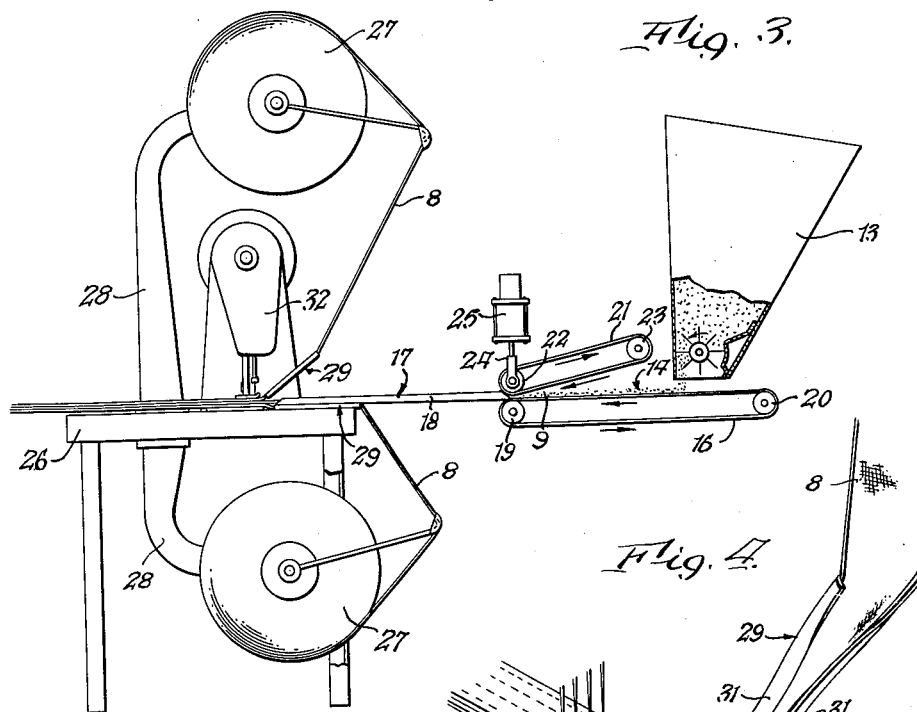
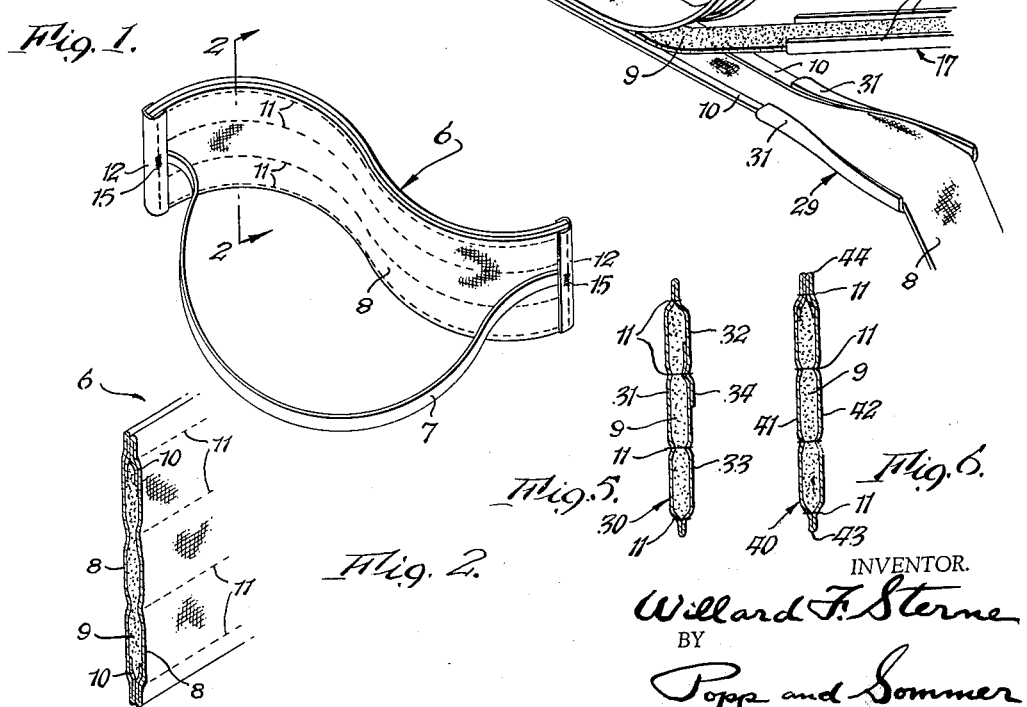
INVENTOR.
Willard F. Sterne
BY
Popp and Sommer
Attorneys.

United States Patent Office 3,089,146
Patented May 14, 1963

3,089,146
SWEAT BAND
Willard F. Sterne, Snyder, N.Y., assignor to American Allsafe Company, Inc., Buffalo, N.Y., a corporation of New York
Filed Apr. 2, 1959, Ser. No. 803,602
1 Claim. (Cl. 2—181)

This invention relates to an improvement in sweatbands and to a new and novel method and machine for fabricating such sweatbands.

Sweatbands of the prior art when formed of a solid piece of cellulose sponge or equivalent hard drying material had the disadvantage, when dry, of being hard and somewhat abrasive and therefore uncomfortable to apply to one's forehead. Also when made in the form of a thin slab as shown in my Patent 2,223,332 dated November 26, 1940, on repeated use the slab forms into a twisted, distorted Melba toast-like body having little resemblance to a sweatband and very uncomfortable to apply in a dry condition. The sweatband of the present invention represents an improvement over sweatbands of the prior art, since, even though hard drying cellulose sponge forms the essential absorbing agent, it is flexible and comfortable to apply, wet or dry, and also further softens to have greater comfort when wetted. Also it is capable of repeated use without loss of these qualities. In addition, the cellulose sponge granules used will absorb as much as twenty times their weight in water; are provided in adequate quantity to absorb profuse perspiration; are available as a waste by-product; and the thermal conductivity of the present sweatband is good so that evaporation on the exterior surface thereof provides cooling of the forehead of the sweatband user.

The new and novel method and machine for fabricating sweatbands disclosed herein also represents an improvement over prior methods of sweatband fabrication, providing for automatic and continuous production resulting in high volume and low cost manufacture.

One of the objects of the invention is to provide a sweatband having hard drying cellulose sponge as the principal absorbing agent and at the same time is flexible and comfortable to apply when dry and expands and softens on wetting to greater comfort, and will not shrink or become hard and uncomfortable upon drying and can be repeatedly reused without loss of these qualities.

Another specific object is to provide a sweatband that had good thermal conductivity which produces a cooling effect on the forehead of the sweatband user.

Another object is to provide such a sweatband having a high degree of absorption.

Another aim is to avoid the use of an adhesive binder for the cellulose sponge particles, binders reducing their absorbency.

Another aim is to provide such a sweatband which is compact for shipping and storage purposes but which swells to operative form on contact with moisture.

Another object is to provide such a sweatband which is made of low cost materials, the absorbing medium in particular being produced from scrap cellulose sponge.

A further object of the invention is to provide a method for fabricating sweatbands, which method lends itself to automatic production techniques resulting in high volume and low cost manufacture.

Another object is to provide a machine for making such sweatbands which is simple and reliable in operation and operates with little supervision.

These and further objects and features of the invention will become apparent from the following description and accompanying drawing wherein:

FIG. 1 is a perspective view of a sweatband representative of an embodiment of the invention;

FIG. 2 is an enlarged perspective sectional view as seen along line 2—2 in FIG. 1;

FIG. 3 is a schematic side elevational view, partly in section, of apparatus employed to practice the invention;

FIG. 4 is a perspective view illustrating a certain phase in the fabrication of the sweatband of the invention;

FIG. 5 is a vertical section through a modified form of sweatband embodying the invention; and FIG. 6 is a similar view of a further modification.

Referring now to the drawing, the numeral 6 identifies a sweatband assemblage illustrative of an embodiment of the invention, which sweatband is of such size, so as to fit upon the forehead of an average individual, and be held thereon by means of an elastic band or cord 7.

The sweatband is formed of two outer layers or facing strips 8 of porous, flexible material, preferably of the cheesecloth or gauze type, and an inner layer of regenerated cellulose sponge granules which are compressed or flattened into a ribbon 9, the granules of which have been compressed into matted cohering relation to one another so that the ribbon 9 is self-sustaining to a limited degree. The particles of cellulose sponge forming the ribbon 9 are preferably made from the scrap resulting from the production of fibered regenerated cellulose sponge for kitchen cleaning and mopping sponges and while hard when dry, in the flattened compressed cohering matter form in which they exist in the ribbon 9 are in the form of a flexible band which is comfortable and adapts itself to the forehead of the user. Such regenerated cellulose sponge will absorb approximately twenty times its weight in water.

Each longitudinal edge of the outer facing layers 8 is turned in, as indicated at 10 and these edges are arranged in overlapping relation, and a row of stitching 11 is run through companion inturned edges 10 of both facing strips 8 as well as through the intermediate part of the sweatband to form four parallel lines of stitching. It is apparent, however, that the intermediate lines of stitching 11 could be zig-zag to provide a quilted surface. It will be seen that the intermediate rows of stitching forms the ribbon 9 into segments which prevents bunching of the cellulose sponge granules even with repeated use. A binding strip 12 is sewn to each end of the sweatband for enclosing the ribbon 9 and bar tack stitching 15 secures the ends of the cord 7, the ends of the cord 7 extending under the binding strips 12.

The sweatband so formed will be found to be very effective in use, since it will allow expansion of the compressed or flattened granules of the ribbon 9 of cellulose sponge granules upon wetting. The relatively large voids between the granules of the layer 9 when expanded by wetting, especially where gauze is used as the material of the outer layers 8, exposes an extensive surface of the inner ribbon 9 to the air so that a high rate of evaporation is provided, thus resulting in a cooling effect upon the forehead of the user. Further the sweatband can be reused indefinitely without loss of its flexibility and comfort in applying, while dry, to the forehead of the user, the granules, once having expanded, filling the segmental spaces provided by the rows of stitching and being prevented from bunching or lumping.

The sweatband of the invention lends itself to high production manufacturing techniques, and a machine and method for fabrication is illustrated in FIGS. 3 and 4.

As illustrated therein, a hopper 13 is arranged to deposit a constant or measured stream of regenerated cellulose sponge granules 14 in the form of a layer of predetermined width and thickness upon the upper stretch of a horizontal belt 16 for movement onto a flat bottomed stationary conveyer channel or slideway 17 having upstanding sides 18. The belt 16 is an endless belt carried by two rollers 19 and 20, one of which can be a drive roller moving so that the upper stretch of the belt 16 moves the layer 9 of cellulose sponge granules deposited thereon continuously toward one end of the conveyer channel 17 so that this layer is deposited thereon to slide along this conveyer channel. Before being deposited to slide along the conveyer channel 17, the layer 9 of cellulose sponge granules 14 are compressed into a flattened, matted ribbon, the individual granules 14 being flattened into cohering relation with one another and to produce a ribbon which is self-sustaining to a degree and will maintain its coherent ribbon form while sliding along the conveyer channel 17. This compression of the layer 9 is effected by a top belt 21 which travels around two rollers 22, 23 one of which is arranged directly over the bottom belt roller 19 and is forced downwardly by a piston means 24 in a cylinder 25. It will be seen that the layer 9 of cellulose sponge granules 14 is compressed between the rollers 19, 22, this pressure being sufficient to flatten and cohere the granules to one another and to produce a self-sustaining ribbon which will maintain its form in traveling along the stationary conveyer channel 17.

From the conveyer channel 17 the self-sustaining strip of matted or cohered granules 14 is deposited upon a sewing table 26 and, in so being deposited upon the sewing table, is sandwiched between the pair of gauze facing strips 8. The gauze strips 8 are fed from rolls 27 supported by frame means 28 above and below the sewing table 26. The gauze strips are fed through upper and lower gauze folders 29 which not only direct the gauze strips onto the sewing table 26 in centered relation to the ribbon 9 of cohered matted cellulose sponge granules arranged therebetween, but also produces inwardly folded edges 10 at opposite sides of each strip. For this purpose the gauze folders are in the form of flat metal strips along which each strip 8 passes and the edges 31 of each of which are curled around the corresponding gauze strip progressively to a greater degree so that these edges of the gauze strips are progressively curled or folded in and then flattened down to produce the inturned edges 10, as previously described. A sewing machine or head 32, constructed to simultaneously produce, say, the four lines of stitching 11 shown, is arranged above the table 26 to sew the inturned overlapping edges 10 of the two gauze facing strips 8 together, as well as to produce two lines of stitching through these facing strips and ribbon 9.

It will be seen from the foregoing that the method and machine of the invention will lend itself to the high volume production of sweatbands, since it simply comprises the steps of compressing a moving layer of cellulose sponge granules into a ribbon of cohered matted granules, moving the ribbon longitudinally between two strips of porous, flexible facing material having inturned edges, and sewing the assemblage with rows of parallel stitches some of which join the overlapping edges 10 of the two strips and others of which pass through the matted ribbon 9 to hold the ribbon in separate segments to prevent bunching thereof. After the assemblage is so formed, it is cut into given lengths, either manually or by machine, and binding strips 12 and a head band 7 are affixed to the ends to provide a sweatband 6 as previously disclosed.

In FIGS. 1-4 the ribbon 9 of matted, cohered cellulose sponge granules is shown as enveloped by two separate strips 8 of porous, resilient material having inturned overlapped edges 10 which flank the ribbon 9. It will be apparent that instead the ribbon 9 of matted, cohered cellulose sponge granules can be enveloped in a single strip of flexible porous material as illustrated in FIG. 5.

In this form of the invention the ribbon 9 of matted, cohered cellulose sponge particles is enveloped in a single strip 30 of gauze or the like the center part 31 of this strip forming a facing strip for one side of the ribbon 9 and the side portions 32, 33 extending around the edges of the ribbon 9 and being brought in overlapping relation, as indicated at 34, to provide a facing strip for the opposite side of the ribbon 9. At the opposite longitudinal edges of the ribbon 9, the facing strip 30 is shown as extending beyond the edges of the ribbon 9 and these extensions are shown being secured together by rows 11 of stitching. To form the ribbon 9 into separate segments, two additional longitudinal rows of stitching 11 are provided, one of these rows passing through the overlapping portions, indicated at 34, of the edges of the facing strip 30 as well as through the ribbon 9, and the other passing through the sides 31, 33 of the strip and also through the ribbon 9.

Another way of making the sweatband of the present invention from a single facing strip of flexible, porous material is illustrated in FIG. 6. In this form of the invention the strip 40 is folded along its center to provide two side strips 41, 42 in contact with opposite sides of the ribbon 9, the fold 43 preferably projecting beyond the adjacent edge of the ribbon 9.

The free edges 44 of the strip 40 extend beyond opposite edge of the ribbon 9 and are preferably inturned and brought into overlapping relation to each other as shown. As with the other forms of the invention four lines of stitching 11 are shown, one passing through the folded center edge 43 of the facing strip; another securing together the overlapping inturned edges 44; and two additional lines 11 of stitching extending through the two sides 41, 42 of the facing strip and also through the ribbon 9 so as to form the ribbon 9 into separate segments to prevent bunching thereof, particularly when reused.

From the foregoing it will be seen that the present invention provides a method and machine for making a novel sweatband which is initially very compact, which has the high degree of absorbency of cellulose sponge, and at the same time avoids the difficulties normally due to the hardening of such sponge when dry. It will also be seen that the sweatband, as well as the method and machine for making the same, have the advantages and accomplish the objectives set forth and at the same time provide a very low cost sweatband.

What is claimed is:

A sweatband for absorbing body sweat and evaporating it to the atmosphere to provide an evaporative cooling effect and which is flexible to apply and will not become hard or uncomfortable upon drying so that it can be used repeatedly with equal effectiveness and comfort, comprising a multiplicity of flat, compressed granules of hard drying regenerated cellulose sponge matted together and cohered with one another to provide a ribbon which is self-sustaining initially to a limited degree, at least one facing strip of flexible porous material positioned against opposite faces of said ribbon, means joining said facing strips together and holding said ribbon and facing strips in assembled relation, and means securing said joined facing strips and ribbons to the body of the user.

References Cited in the file of this patent

UNITED STATES PATENTS

| | | |
|---|---|---|
| 1,689,539 | Wagner | Oct. 30, 1928 |
| 1,889,913 | Birum et al. | Dec. 6, 1932 |
| 2,223,332 | Sterne | Nov. 26, 1940 |
| 2,265,530 | Kleinman | Dec. 9, 1941 |
| 2,364,839 | Young | Dec. 12, 1944 |
| 2,702,067 | Goldberg | Feb. 15, 1955 |
| 2,783,474 | Campagna et al. | Mar. 5, 1957 |
| 3,007,207 | Salhofer | Nov. 7, 1961 |